UNITED STATES PATENT OFFICE.

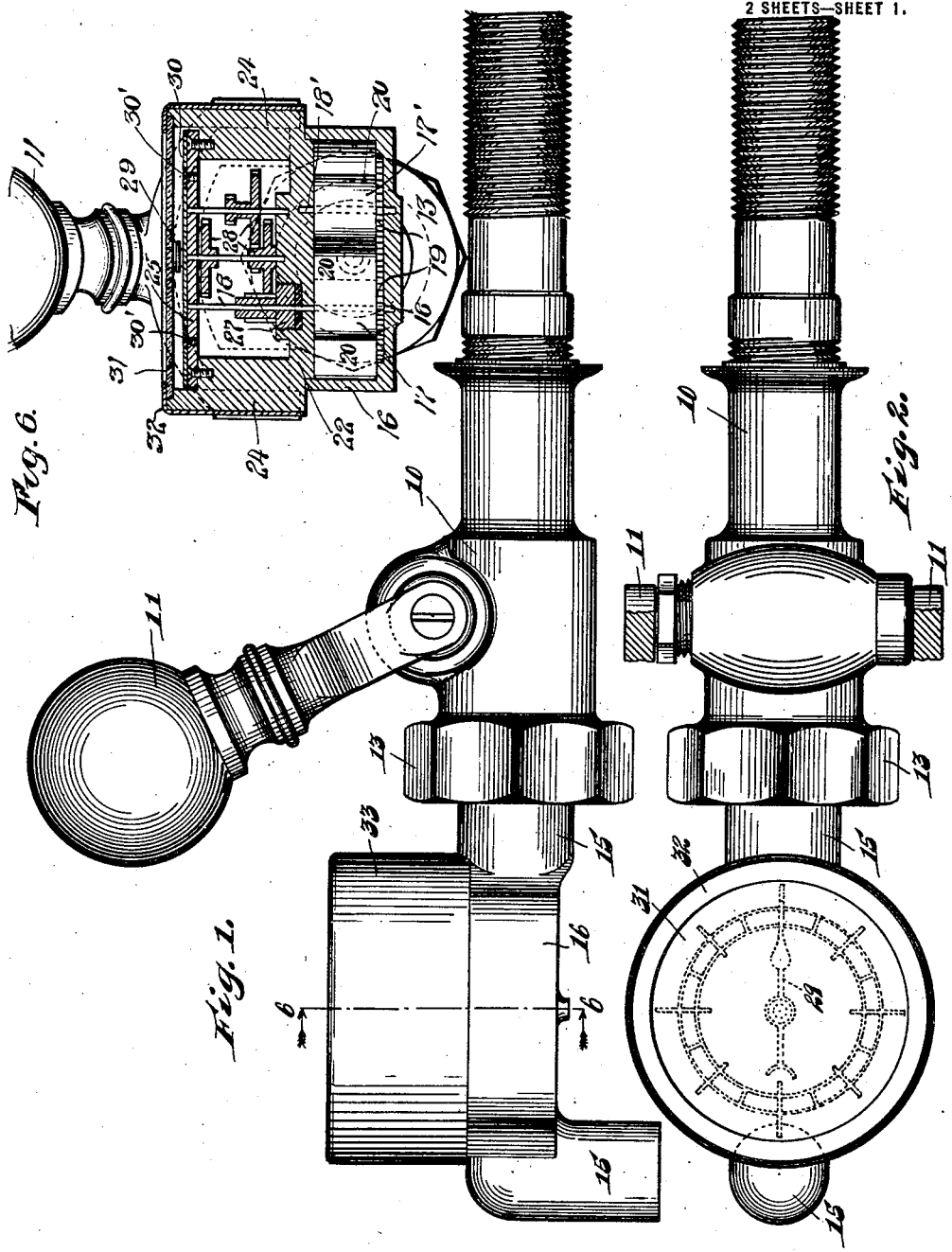

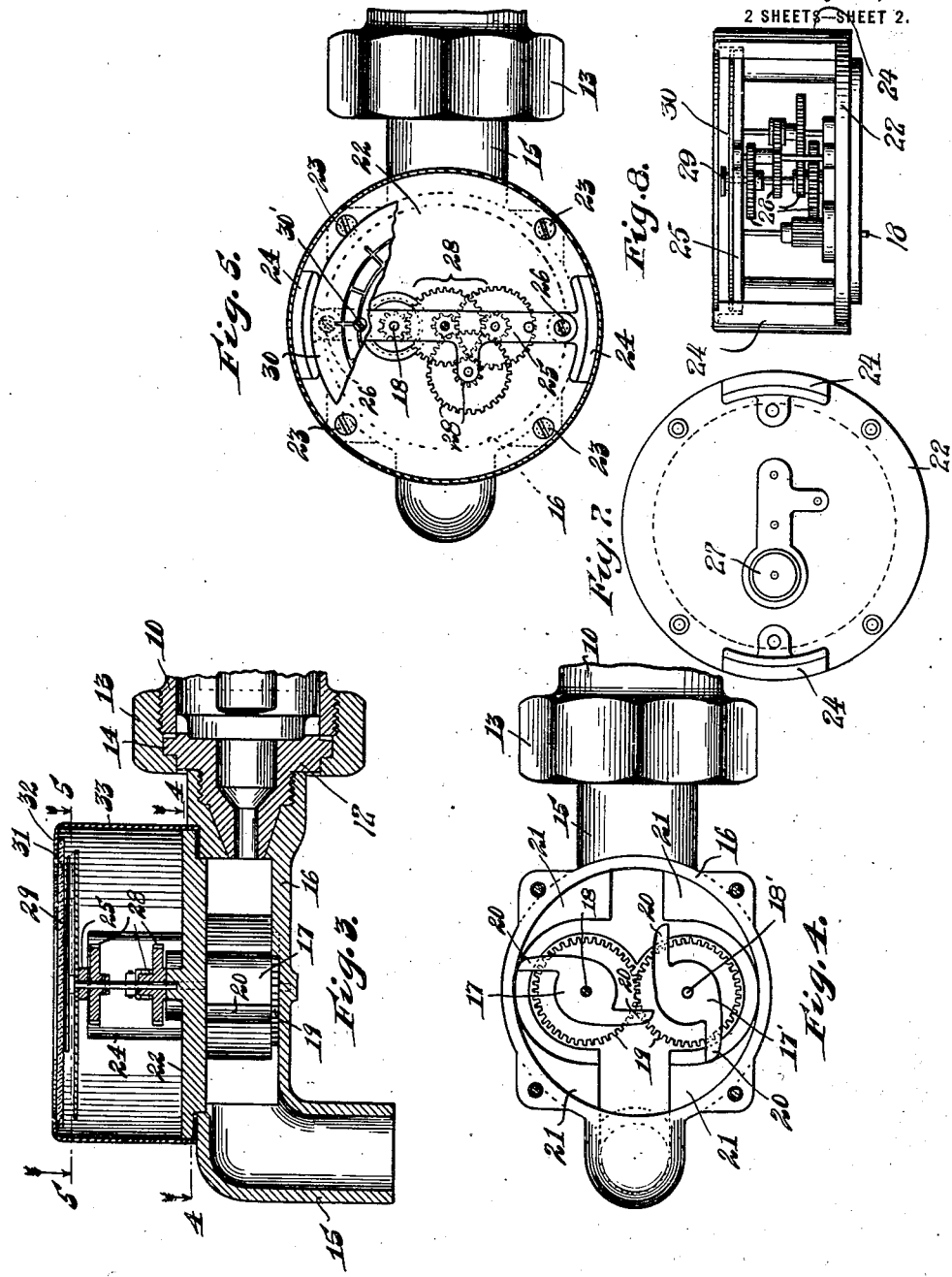

FRANK SCHORIK, OF CHICAGO, ILLINOIS.

LIQUID-MEASURING DEVICE.

1,304,607. Specification of Letters Patent. Patented May 27, 1919.

Application filed December 3, 1917. Serial No. 205,092.

*To all whom it may concern:*

Be it known that I, FRANK SCHORIK, a citizen of the United States, and a resident of the city of Chicago, county of Cook, and State of Illinois, have invented certain new and useful Improvements in Liquid-Measuring Devices, of which the following is a specification.

My invention relates to improvements in liquid measuring devices, designed for use especially in saloons or other places where beer or other liquids are dispensed and sold in certain comparatively small quantities.

The object of my invention is the production of a liquid measuring device of the character mentioned, which will be of durable and economical construction and which will be adapted to accurately measure liquid, as the same is dispensed or discharged from the pipe, in connection with which the device is used.

A further object is the production of a device as mentioned, which will be so constructed that the same will not be susceptible to readily becoming inoperative, and which will be highly efficient in use.

The invention consists in the combinations and arrangements of parts hereinafter described and claimed.

The invention will be best understood by reference to the accompanying drawings forming a part of this specification, and in which, Figure 1 is a side elevation of a liquid discharge faucet equipped with measuring mechanism, embodying the invention, Fig. 2, a partially sectional top plan view of Fig. 1, Fig. 3, a central vertical longitudinal section through the front end portion of the construction seen in Fig. 1, Fig. 4, a section taken on substantially line 4—4 of Fig. 3 with the upper gear housing and cover plate omitted.

Fig. 5, a section taken on substantially line 5—5 of Fig. 3, with a portion of the dial broken away to expose underlying parts, Fig. 6, a section taken on substantially line 6—6 of Fig. 1, Fig. 7, a top plan view of the plate which forms the bottom of the gear housing, and Fig. 8, a side elevation of the gearing which connects the vaned wheels and the rotatable indicator.

The preferred form of construction as illustrated in the drawings is shown in connection with a valved discharge pipe 10, such as is used at the present time in saloons and like places, where beer or other beverages are dispensed. In connection with pipe 10 is shown the usual pivoted handle 11 for operating the control valve, the rearward end of said pipe 10 being threaded for connection with supply piping used in connection therewith. Provided at the front end of pipe 10 is a collar 12, held in operative position by means of a union 13 threaded upon pipe 10, said union engaging with an annular flange 14 provided upon said collar. Said collar 12 is formed with a threaded outward projection with which engages an angular discharge pipe or housing 15. The pipe 15 is formed with a circular or cylindrical enlargement 16 which is open at its upper side and in which are rotatably mounted wheels 17 and 17', fixed to shafts 18 and 18'. Said wheels are operatively connected by meshing gears 19, whereby said wheels will rotate in unison. Upon said wheels are formed tangentially projecting vanes 20, said wheels being so positioned that said vanes alternate with each other in successively traversing the space between the inner sides of said wheels when the latter are rotated. In order to insure the flow of liquid toward said space between wheels 17 and 17', lugs or abutments 21 are formed in the housing member 16, as clearly seen in Fig. 4.

The upper side of the housing member 16 is closed by a plate 22 secured in position by screws 23. Arising from opposite sides of plate 22 are posts 24, connected at their upper ends by a bar 25 secured to said posts by screws 26. The shaft 18 of the wheel 17 passes entirely through the plate 22, the same being surrounded with a suitable packing 27, as seen in Fig. 6, to prevent leakage. Said shaft 18 is operatively connected through a train of reducing gears 28, interposed between plates 22 and bar 25, with a rotatable indicator 29, with which coöperates a suitably scaled dial 30 secured to the upper side of bar 25 by screws 30'. Said dial and indicator are protected by a transparent cover plate 31 of glass which rests at opposite sides upon shoulders formed for the reception thereof at the upper ends of posts 24. The cover plate 31 is held in operative position by an inwardly extending annular flange 32 formed at the upper edge of an annular housing-forming member 33, which engages against the outer sides of posts 24 and the periphery of plate 22, forming the lateral wall of the housing inclosing gears 28, and the dial and indicator coöperating therewith. Said member 33 is held in position through friction, the arrangement permitting of ready removal of the same, when desired, to afford ready access to the gears or parts coöperating therewith.

With a construction as set forth, it will be seen, that, in the flow of liquid through the member 15 from the discharge pipe 10, the same will impinge upon vanes 20 causing wheels 17 and 17' to rotate, the rotation of said wheels effecting movement of the indicator 29. The operator, by observance of said indicator in connection with dial 30, will be able to ascertain the exact amount of liquid discharged or passed through the device. The alternating arrangement of the vanes upon the wheels 17 and 17', together with the tangential disposition thereof, has been found to constitute an exceptionally delicate and accurate means of registering the flow of liquid and one which, because of its simplicity, is not susceptible to readily becoming inoperative. The arrangement also is such as to permit of ready application of the device to any of the standard liquid discharge pipes used in saloons at the present time.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having described my invention what I claim as new and desire to secure by Letters Patent is:

1. The combination with a liquid passage, of a pair of rotatably mounted wheels arranged side by side, said wheels having alternating vanes against which the liquid flowing through said passage is adapted to engage as said vanes successively pass into and through the space between the near sides of said wheel; a gear connection between said wheels whereby the same rotate in unison; a rotatably mounted indicator; means for operatively connecting one of said wheels with said indicator, said means comprising a train of reducing gears; a chamber housing said gears; a cross bar at the outer side of said housing forming a bearing for said gears; and a dial on said cross bar for coöperation with said indicator, substantially as described.

2. The combination with a liquid passage, of a pair of rotatably mounted wheels arranged side by side, said wheels having alternating vanes against which the liquid flowing through said passage is adapted to engage as said vanes successively pass into and through the space between the near sides of said wheels; a gear connection between said wheels whereby the same rotate in unison; a rotatably mounted indicator; means for operatively connecting one of said wheels with said indicator, said means comprising a train of reducing gears; a chamber housing said gears; a dial for coöperation with said indicator; a transparent cover over said dial; and an annular member forming the lateral wall of said chamber and holding said transparent cover in place, substantially as described.

3. The combination with a liquid passage, of a pair of rotatably mounted wheels arranged side by side, said wheels having alternating vanes against which the liquid flowing through said passage is adapted to engage as said vanes successively pass into and through the space between the near sides of said wheels; a gear connection between said wheels whereby the same rotate in unison; a rotatably mounted indicator; means for operatively connecting one of said wheels with said indicator, said means comprising a train of reducing gears; a chamber housing said gears; a dial for coöperation with said indicator; a transparent cover over said dial; and a frictionally held annular member forming the lateral wall of said chamber and holding said transparent cover in place, substantially as described.

In testimony whereof I have signed my name to this specification in the presence of two subscribing witnesses.

FRANK SCHORIK.

Witnesses:
ARTHUR A. OLSON,
JOSHUA R. H. POTTS.